(12) United States Patent
Frendo et al.

(10) Patent No.: US 12,335,239 B2
(45) Date of Patent: *Jun. 17, 2025

(54) PERSONALIZED SECURE COMMUNICATION SESSION MANAGEMENT

(71) Applicant: Journey.ai, Denver, CO (US)

(72) Inventors: Michael Joseph Frendo, Boulder, CO (US); Robert Taylor Bartlett, Wheat Ridge, CO (US); Alexander John Shockley, Denver, CO (US); James M. Behmke, Duxbury, MA (US)

(73) Assignee: Journey.ai, Denver, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 18/218,937

(22) Filed: Jul. 6, 2023

(65) Prior Publication Data

US 2023/0370430 A1    Nov. 16, 2023

Related U.S. Application Data

(63) Continuation of application No. 17/200,034, filed on Mar. 12, 2021, now Pat. No. 11,736,445.

(51) Int. Cl.
*H04L 9/18*      (2006.01)
*G06F 21/42*     (2013.01)
(Continued)

(52) U.S. Cl.
CPC ...... *H04L 63/0272* (2013.01); *H04L 12/4641* (2013.01); *H04L 63/029* (2013.01); *H04L 63/0428* (2013.01)

(58) Field of Classification Search
None
See application file for complete search history.

(56) References Cited

U.S. PATENT DOCUMENTS 8,316,237 B1   11/2012   Felsher et al.
8,443,435 B1    5/2013   Schroeder
(Continued)

FOREIGN PATENT DOCUMENTS

WO   WO-2015119606 A1 *  8/2015  ............. H04L 12/00

OTHER PUBLICATIONS

Comparative Analysis of IEEE 802.1x Authentication Methods. Akhlaq. Academia. (Year: 2007).

(Continued)

*Primary Examiner* — Venkat Perungavoor
(74) *Attorney, Agent, or Firm* — BEHMKE INNOVATION GROUP LLC; James M. Behmke; Andy L. Schofield

(57) ABSTRACT

The techniques herein are directed generally to personalized secure communication session management, such as for virtual private networks (VPNs). In one embodiment, a user is authenticated at a client device to verify that the user is present at the client device and authorized to access one or more secured resources, and in response, a secure communication session is established for the client device to access the secured resources. At a later time during the secure communication session, it is determined whether the user is still authenticated at the client device, such that if so, access to the one or more secured resources is maintained on the secure communication session, or else access is restricted to the one or more secured resources (e.g., the session is terminated, or access is otherwise limited).

18 Claims, 9 Drawing Sheets

(51) Int. Cl.
*G06F 21/62* (2013.01)
*H04L 9/40* (2022.01)
*H04L 12/46* (2006.01)
*H04L 9/12* (2006.01)

(56) References Cited

U.S. PATENT DOCUMENTS

| | | |
|---|---|---|
| 8,607,325 B2 | 12/2013 | Kennedy |
| 9,336,356 B2 | 5/2016 | Parla et al. |
| 9,736,154 B2 | 8/2017 | Wilson et al. |
| 9,832,019 B2 | 11/2017 | Choi |
| 9,959,694 B2 | 5/2018 | Lindsay |
| 10,135,802 B2 | 11/2018 | Miu |
| 10,510,077 B2 | 12/2019 | Davis |
| 10,523,660 B1 | 12/2019 | Volkov et al. |
| 11,461,440 B2 | 10/2022 | Joseph |
| 2004/0054902 A1 | 3/2004 | Fujimoto et al. |
| 2005/0177724 A1* | 8/2005 | Ali .................... G06F 21/31 713/168 |
| 2005/0193103 A1* | 9/2005 | Drabik .............. H04L 63/0272 709/221 |
| 2005/0198262 A1 | 9/2005 | Barry et al. |
| 2012/0260314 A1 | 10/2012 | Babula et al. |
| 2014/0068726 A1 | 3/2014 | Jakobsson |
| 2016/0142374 A1 | 5/2016 | Clark |
| 2017/0262353 A1 | 9/2017 | Puri et al. |
| 2018/0324144 A1 | 11/2018 | Shi et al. |
| 2020/0044866 A1 | 2/2020 | Nakano et al. |
| 2020/0162431 A1* | 5/2020 | Goldschlag ............. H04L 63/20 |
| 2020/0259830 A1 | 8/2020 | Shaffer et al. |

OTHER PUBLICATIONS

Mobile Intelligent Agent Technologies to Support VoIP Seamless Mobility. Lin. IEEE (Year: 2005).
What Happened in my Network? Mining Network Events from Router Syslogs. Qiu. ACM. (Year: 2010).
Building secure wireless access point based on certificate authentication and firewall captive portal. Soewito. (Year: 2014).

* cited by examiner

ENTERPRISE APPLICATION DASHBOARD 810

CALL SESSION ID 822

123456789

CALLER NAME 824

CALLER ACCOUNT NO. 826

CALLER ACCOUNT BALANCE 828

SESSION NOTES 830

ACTIONS 835

HOLD

FIG. 8B

ENTERPRISE APPLICATION DASHBOARD 810

CALL SESSION ID 822

123456789

CALLER NAME 824

Jonathan Doe

CALLER ACCOUNT NO. 826

00-12-3456-7890

CALLER ACCOUNT BALANCE 828

$12,345,678.90

SESSION NOTES 830

Customer called requesting an increase to their credit card limit. Upon looking into their history, it was determined that...

ACTIONS 835

HOLD  CLOSE  FORWARD

FIG. 8A

PERSONALIZED SECURE COMMUNICATION SESSION MANAGEMENT

RELATED APPLICATIONS

This application is a Continuation application of U.S. patent application Ser. No. 17/200,034, filed Mar. 12, 2021, entitled PERSONALIZED SECURE COMMUNICATION SESSION MANAGEMENT, by Frendo, et al., the contents of which being incorporated herein by reference in its entirety.

TECHNICAL FIELD

The present disclosure relates generally to communication systems, and, more particularly, to personalized secure communication session management (e.g., virtual private networks, VPNs).

BACKGROUND

Users have been teleworking ("working from home" or otherwise working from a location outside of a traditional office/center environment) for a long time. However, recent times have seen an increase in teleworking, particularly as a result of the Covid-19 pandemic. Many teleworkers require access to information that resides on servers on the corporate network. The need to access confidential information by users from the public domain introduces a security challenge.

Numerous techniques were introduced to overcome this challenge. Some companies introduced home routers with a hard-coded virtual private network (VPN) tunnel that provided devices that resided behind this router with access to the corporate network. This solution provided users with a simple (low friction) access to the corporate network, however it introduced a major security risk: Any person who attached a device to a port of this router could gain access to the corporate network and compromise it (e.g., accessing private corporate data, injecting viruses, etc.). Other companies provided access to the corporate network based on a password. While this method personalized to some extend the access privileges, it has the disadvantage that people's passwords can be guessed or otherwise compromised. To strengthen the security of the network, other companies employed a token based on a dynamic random number, where the user must enter that token in order to facilitate access to the corporate network. While this method reduces the risk of compromising a static password, it can still be compromised if an adversary were to gain access to the dynamic token generator.

Other companies developed multi-factor authentication (MFA) tools that further secure access to a corporate network. The tools may be deployed on a specific first device and as such any adversary must have access to the first device in order to gain access to the network. In addition, when a user of the first device attempts to access the network, the system sends a request to a second device, e.g., a mobile phone, requesting an acknowledgement that the legal user is the one who is attempting to access the corporate network using the first device. Access of the user of the first device is granted only after the user verifies on the second device that he is attempting to access the network. While the requirement that the user possesses the two different devices reduces the risk that an adversary would access the corporate network and compromise any sensitive data, the risk is still not totally mitigated.

In particular, users who work from a remote location (e.g., home, coffee shop, etc.) may have confidential information displayed on their screen and have a family member, roommate, or bystander see information to which they should not be privileged. This is especially important during quarantine times such as the current pandemic time when students cannot attend school and they stay home during times when their parents' work necessitates access to confidential information.

What is needed is system wherein confidential information is securely presented only to people who have the right to access it.

SUMMARY

The techniques herein are directed generally to personalized secure communication session management (e.g., virtual private networks, VPNs). In one embodiment, an illustrative method according to one or more embodiments of the present disclosure may comprise: authenticating, by a process, a user at a client device, the authenticating verifying that the user is both present at the client device and authorized to access one or more secured resources; establishing, by the process in response to authenticating the user, a secure communication session for the client device to access the one or more secured resources; confirming, by the process, at a later time during the secure communication session, whether the user is still authenticated at the client device; maintaining, by the process, the access to the one or more secured resources on the secure communication session at the later time in response to the user still being authenticated at the client device at the later time; and restricting, by the process, the access to the one or more secured resources on the secure communication session at the later time in response to the user no longer being authenticated at the client device at the later time.

Other embodiments of the present disclosure may be discussed in the detailed description below, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 8A-8B illustrate an example of providing personalized secure communication management with auto-redaction of secure data according to one or more embodiments herein.

DESCRIPTION OF EXAMPLE EMBODIMENTS

A computer network is a distributed collection of nodes (e.g., transmitters, receivers, transceivers, etc.) interconnected by communication links and segments for transporting signals or data between the nodes, such as personal computers, workstations, mobile devices, servers, routers, or other devices. Many types of computer networks are available, including, but not limited to, local area networks (LANs), wide area networks (WANs), cellular networks, broadband networks, infrastructure or backhaul networks, public switched telephone networks (PSTNs), and many others.

Figure 1:
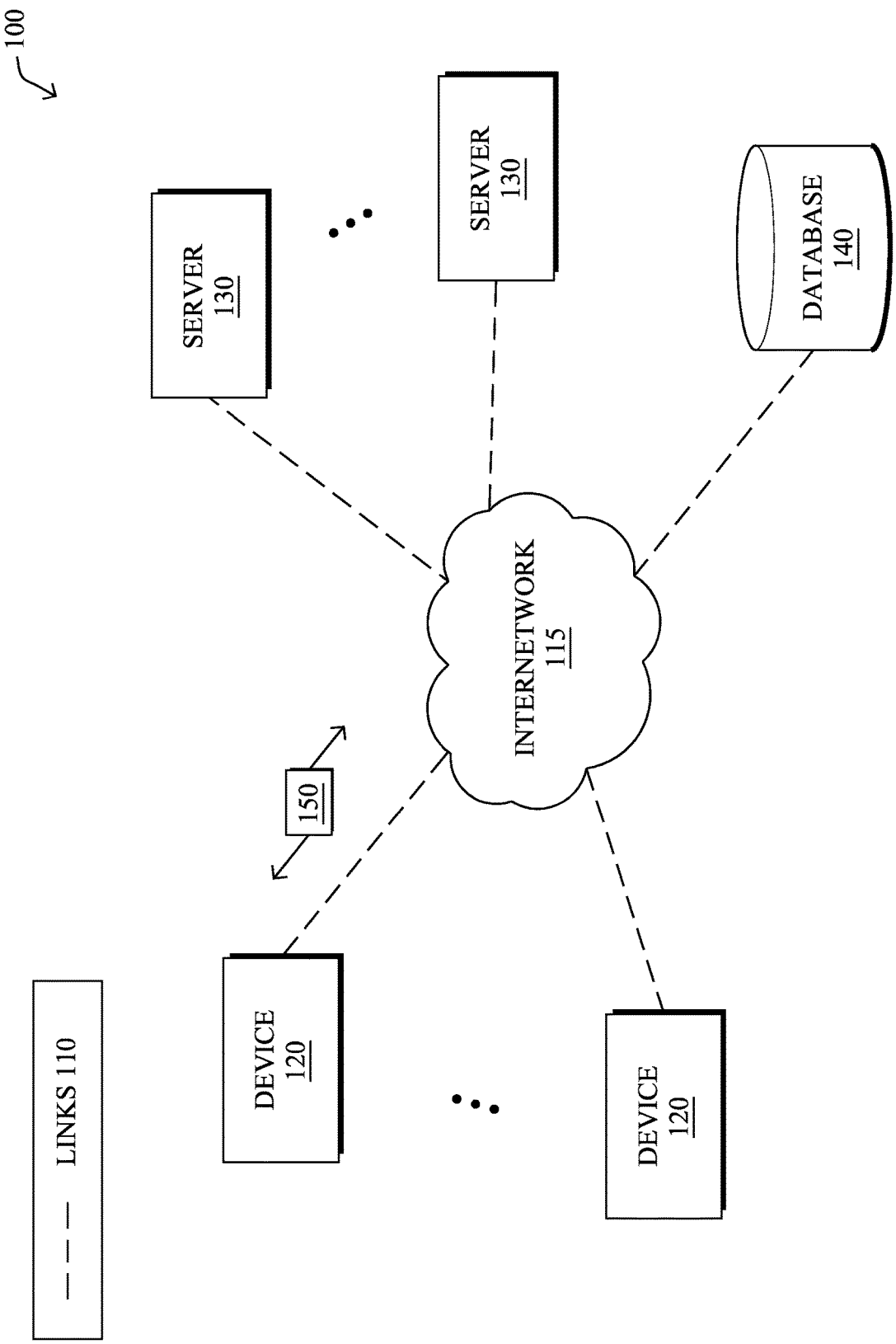
FIG. 1 illustrates an example simplified computer network.

FIG. 1 illustrates an example, and simplified, computer network 100. As shown, computer network 100 may contain various devices communicating over links 110 and an internetwork 115, such as end devices 120, servers 130, databases 140 (which may be part of servers 130 or in communication with and under the control of servers 130), and other devices as will be appreciated by those skilled in the art. Data transmissions 150 (e.g., packets, frames, messages, transmission signals, etc.) may be exchanged among the nodes/devices of the computer network 100 using predefined communication protocols where appropriate over links 110. In this context, a protocol consists of a set of rules defining how the nodes interact and exchange information with each other.

Notably, the computer network 100 may comprise various individual networks intercommunicating with each other, such as LANs, WANs, cellular/LTE networks, PSTN, and so on, and may include any number of wired or wireless links between the devices, accordingly. Note also that while links 110 are shown generically interconnecting with the internetwork 115, any number of intermediate devices (e.g., routers, switches, firewalls, etc.) may actually make up the composition of the network 100 and internetwork 115, and the view shown herein is merely a simplified illustration.

End devices 120 may comprise different types of devices, such as, e.g., personal computers, desktop computers, laptop computers, mobile devices, tablets, smartphones, wearable electronic devices (e.g., smart watches), smart televisions, set-top devices for televisions, workstations, smart vehicles, terminals, kiosks, automated teller machines (ATMs), applications running on such devices, and so on, often interfacing with human users, though not necessarily. For instance, end devices 120 may also comprise drones, automated vehicles, artificial intelligence "beings" or robots, internet of things (IoT) devices, and so on.

Servers 130 and/or databases 140 may comprise singular servers and/or databases, server and/or database farms, cloud-based server and/or database services, network attached storage (SAN), and any other type or configuration of computing devices that provides computing and/or storage services as will be appreciated by those skilled in the art. Servers 130 and/or databases 140 may be centralized (i.e., processing and/or storage occurring on a single device or within a single location of devices) or distributed/decentralized (i.e., processing and/or storage occurring across multiple devices or across a plurality of locations). Notably, for example, servers 130 and/or databases 140 may be deployed on the premises of an enterprise or may be cloud-based.

Figure 2:
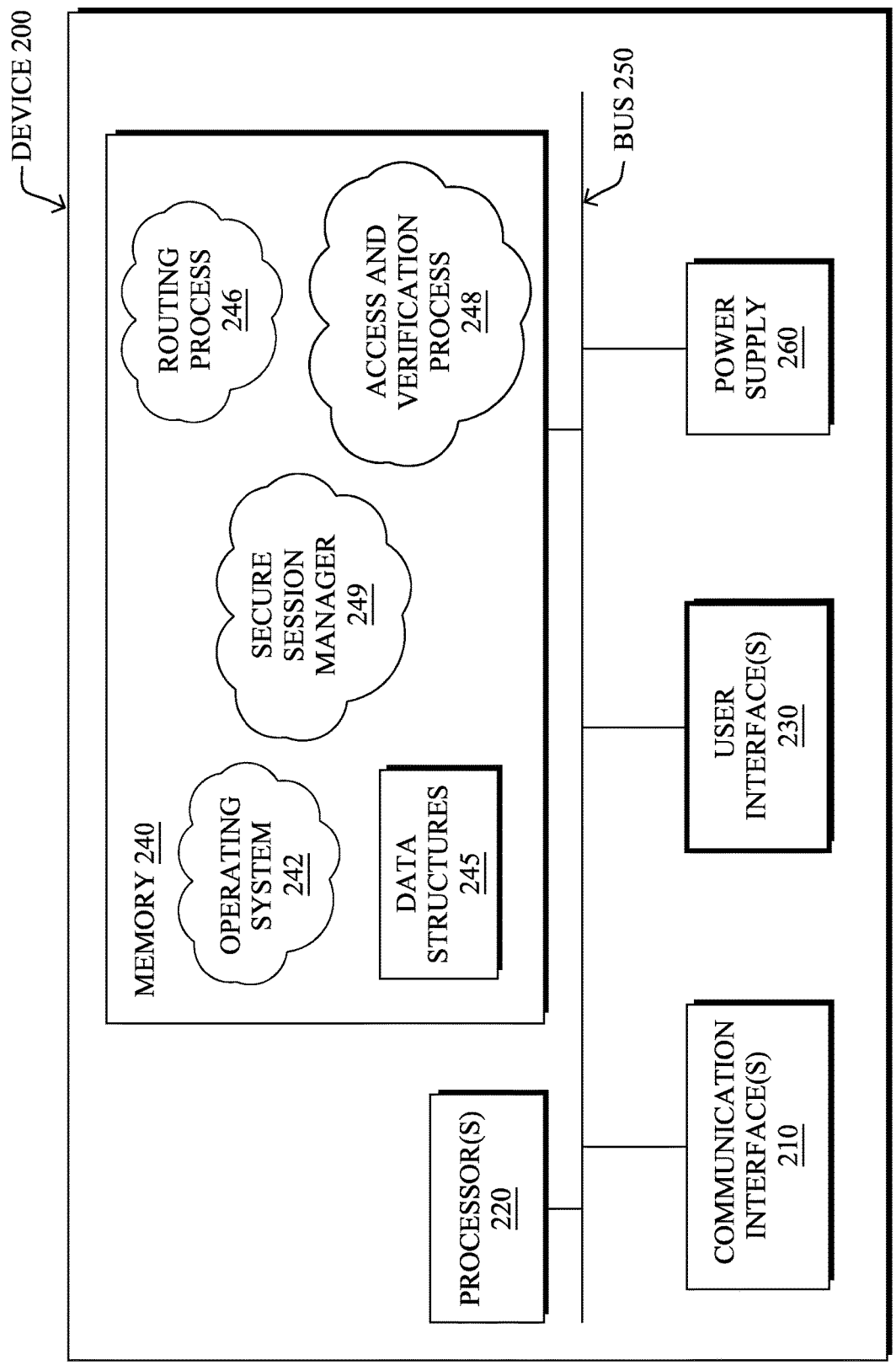
FIG. 2 illustrates an example of a computing device.

FIG. 2 is a simplified schematic block diagram of an example computing device 200 that may be used with one or more embodiments described herein (e.g., end device 120, sever 130, database 140, etc.). Illustratively, device 200 may generally include one or more communication interfaces 210, one or more processors 220, and a memory 240 interconnected by a system bus 250 or other dedicated circuitry, and is powered by a power supply system 260. Additionally, the device 200, where required, may comprise one or more user interfaces 230 configured to solicit and receive user input (input/output or "I/O" components, such as displays, keyboards, touchscreens, biometrics, and so on).

The communication interfaces 210 include the mechanical, electrical, and signaling circuitry for communicating data over wired and/or wireless links of a communication network.

The memory 240 includes a plurality of storage locations that are addressable by the processor(s) 220 for storing software programs and data structures associated with the embodiments described herein. The processor(s) 220 may comprise necessary elements or logic adapted to execute the software programs and manipulate the data structures 245. An operating system 242, portions of which are typically resident in memory 240 and executed by the processor(s) 220, functionally organizes the device by, among other things, invoking operations in support of software processors and/or services executing on the device. Illustratively, these software processes and/or services may include one or more functional processes 246 (e.g., specific to functionality of the device), an example "access and verification" process 248 that is configured to perform the operations described herein, particularly in conjunction with secure session manager (management process) 249.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

——Access Control and Identity Verification——

One major problem faced today is verification of users at the ends of various communications. For example, a company often wants to confirm that they are communicating with an intended customer, while a customer often wants to confirm that they are communicating with the intended company. The same could be true for any two users or end-points at either end of a communication, particularly for secure communication sessions (e.g., virtual private networks, "VPNs", as described herein).

For example, when a customer communicates with a bank, or when the bank's contact center agent is logged in to the bank's portal, it is important to be able to verify both users on either end of the communication. This is particularly the case when the contact center agent has access to internal bank information. Various mechanisms to verify identity, such as passwords, security questions, multi-factor authentication (MFA) requests, and so on, may not prevent people close to the intended user from correctly responding to such prompts. (For instance, family or friends may know many of the answers, such as first car, mother's maiden name, street the user grew up on, etc., and if MFA verification uses the phone, such as a text message, email, etc., then all MFA accomplishes is confirming that the answerer has the user's phone, and not necessarily that they are, in fact, the user.) In addition, as described below, such techniques do not prevent a verified user from walking away from a secure session to allow, or otherwise enable, others to access the session, nor does it prevent unverified users from being able to view any displayed information over the verified user's shoulder.

Information privacy and security are particularly important to consumers and computer technology. With the proliferation of hacking incidents against user information, attack vulnerability has been addressed in many ways to prevent or at least detect unsanctioned access to data and user information. Still, to this day, such efforts have been unable to keep up with the dedication of ill-willed individuals to overcome the many layers of security, the authorized access management, and the overall ever-changing data security landscape set forth by the administrators tasked with protecting the stored and communicated data. As mentioned further above, customers and businesses want to know that their information is secure, whether from hackers breaking into contact center databases, or from unscrupulous contact center agents or people with visibility or access to their displays, who may be stealing personal authentication information, including usernames, passwords, security question answers, and so on, or who may simply be pretending to be a legitimate contact center agent to perform outsourced work for the contact center agent that initially logged in.

Accordingly, to address the needs of today's sophisticated users and companies, and to prevent infiltration by today's sophisticated hackers or even simple "log in and switch" operators, the techniques herein are directed to frictionless user experience and stringent security to prevent improper use or abuse of private information, and also provide intelligent and continued end-user verification without sacrificing the security of the private information. That is, the techniques herein provide access control and continued assurance that a user is, and remains, verified for communications, such as for contact center teleworkers or other individuals communicating over a private secured communication channel (e.g., VPN). In general, the techniques herein first address the verification of the identity of any entity at the end of a communication (i.e., an identity of an end user, such as a contact center agent or other teleworker).

Notably, this disclosure may utilize various aspects of the system described in U.S. patent application Ser. No. 16/861,715, entitled "Providing access control and identity verification for communications between initiating and receiving devices", filed on Apr. 29, 2020 by Shaffer et al., now published as U.S. Patent Application Publication No. 2020/0259830 on Aug. 13, 2020, the contents of which being incorporated herein by reference in its entirety.

Figure 3:
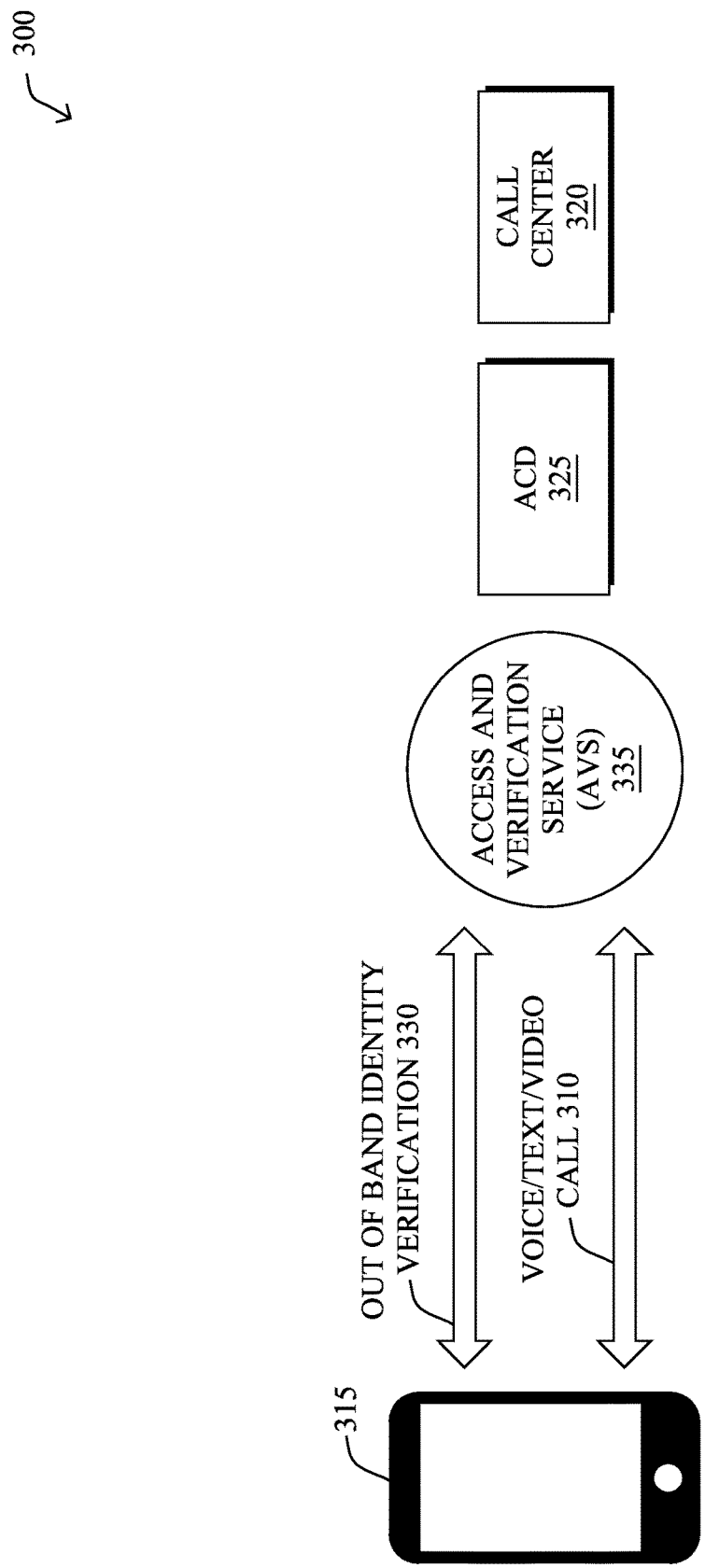
FIG. 3 illustrates an example of verified communication between two endpoints according to one or more embodiments herein.

With reference to FIG. 3 herein, verified communication 300 begins with communications 310 (voice calls, text, video calls, data sessions, etc.) between two endpoints (over a "communication channel"), illustratively user devices 315 and an enterprise, e.g., a contact center 320 (e.g., optionally through an automatic or automated call distributor, "ACD" 325, depending on the type of communication). Through services offered by the techniques herein, referred to generally as "access and verification services" (AVS) (as well as the corresponding AVS application/clients/servers that are configured to participate in such services, as described herein, such as AVS server 335 as shown in FIG. 3), a digital identity verification service may utilize "out of band" data network signaling 330 (over a "verification channel") to ensure the communicating parties (caller and receiver) are who they say they are. Note that as used herein, the "out of band" verification channel implies that the verification occurs outside of the logical or physical communication channel. In other words, where the "communication channel" is whichever transmission medium is providing the communication between the two end devices (e.g., over PSTN, the Internet, etc.), the "verification channel" may be a separate data communication channel (e.g., still possibly over the Internet or other secure transmission network) that provides the verification of identities as described herein (e.g., communications between the end devices and the corresponding AVS application/clients/servers that are configured to facilitate identity verification). Note that in certain example embodiments, the verification channel and communication channel may traverse through the same paths (e.g., both over the internet, but still separate in that the verification does not occur vocally over the voice call or other communication medium, such that the verifier need not hear/see any authentication factors of the entity to be verified).

Figure 4:
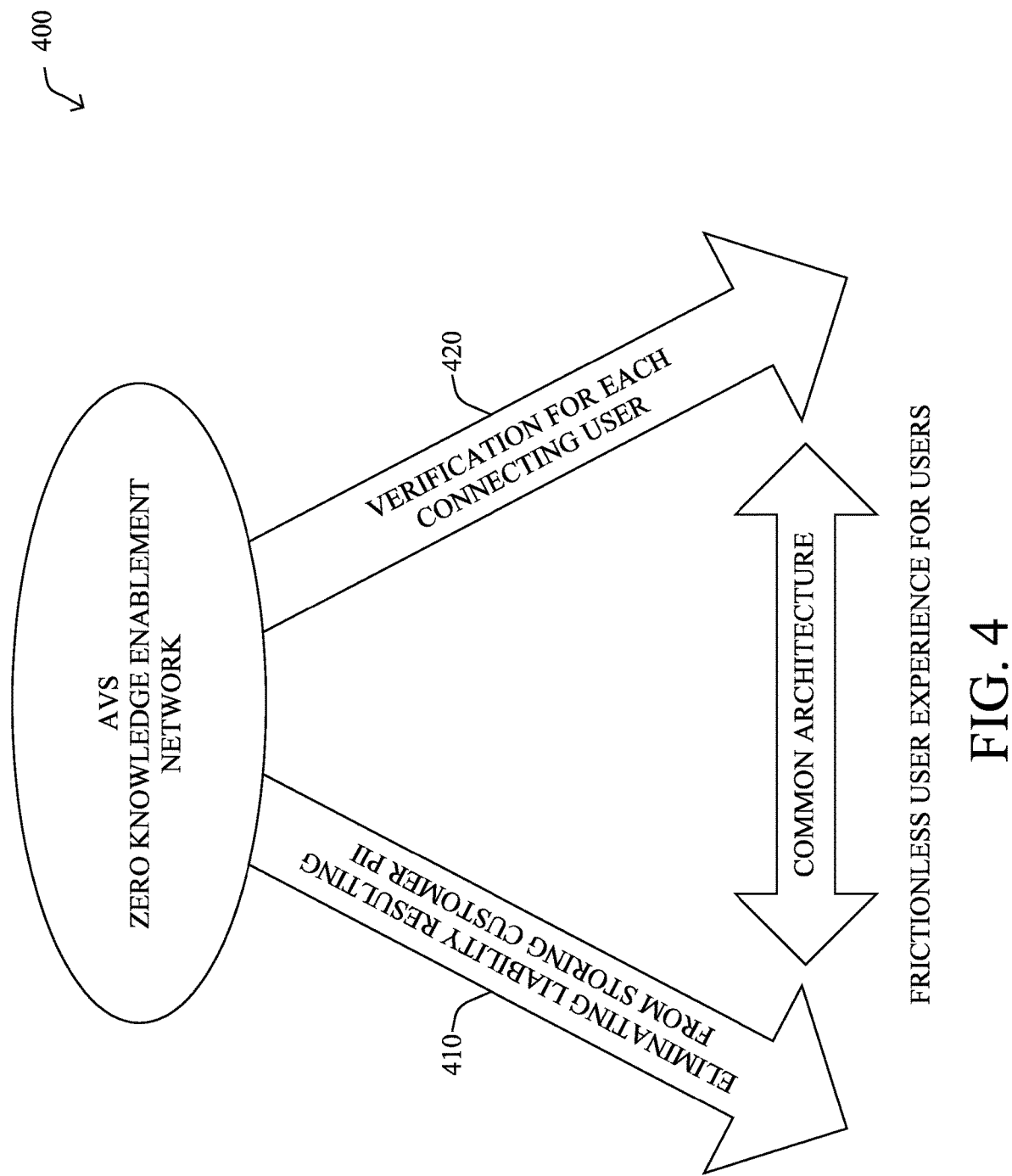
FIG. 4 illustrates an example of a "zero-knowledge enablement network" framework according to one or more embodiments herein.

FIG. 4 illustrates an example of a "zero-knowledge enablement network" framework 400 that may be used for the Identity Network Services system described herein (e.g., AVS). Notably, the left "leg" 410 of the framework is technology that eliminates liability resulting from storing customer personally identifying information (PII). Such a "zero-knowledge" data management network allows users to share verifiable proof of data and/or a limitless list of details about themselves (identify information), and businesses are able to request, consume, and act on the data, providing a hyper-personalized experience—all without a data storage server or those businesses ever seeing or having access to the raw sensitive information. That is, the embodiments herein may utilize a decentralized network for trust, identity, privacy, and personalization that reinvents secure data storage and digital identities, where server-stored data is viewable only by intended recipients (which may even be selected after storage of the data). Perhaps more importantly, the techniques herein allow for devices without access to the data to trust the contents of the data (e.g., without even being able to decrypt and access/read the data), guaranteeing that a user's identity is what he/she claims it to be. That is, the zero-knowledge data management system herein can strategically employ the use of an attestation service (e.g., an identity verification service) or other identity verification service (e.g., biometrics such as facial recognition, iris recognition, fingerprinting, voice recognition, etc.), with controlled and limited access to the data (i.e., if desired, no access to the data itself, but instead only access to the fact that the data (to which one does not have access) is verified to be correct).

The "right leg" 420 of the framework in FIG. 4 addresses verification for each user at either end of a communication, such as users connecting to an enterprise e.g., via a contact center or other user-based application, or, as described below, a secure communication channel, such as a VPN. For instance, using an attestation service or other identify verification service through a common architecture (or through a secure interface), the techniques herein may establish a frictionless user experience for users that is above and beyond typical multi-factor authentication, in terms of security (ensuring identity), privacy (protecting identity), and frictionless user experience (ease of functionality). (Notably, the framework shown in FIG. 4 is merely one example implementation, which is based on extending the services of a common architecture used for the confidential storage of PII and for the user's verification. Other implementations and architectures may be used herein that do not require all of the components described herein, or that use additional components not described herein, and the illustrative examples shown and described herein are not meant to be limiting to the scope of the present disclosure.)

Figure 5:
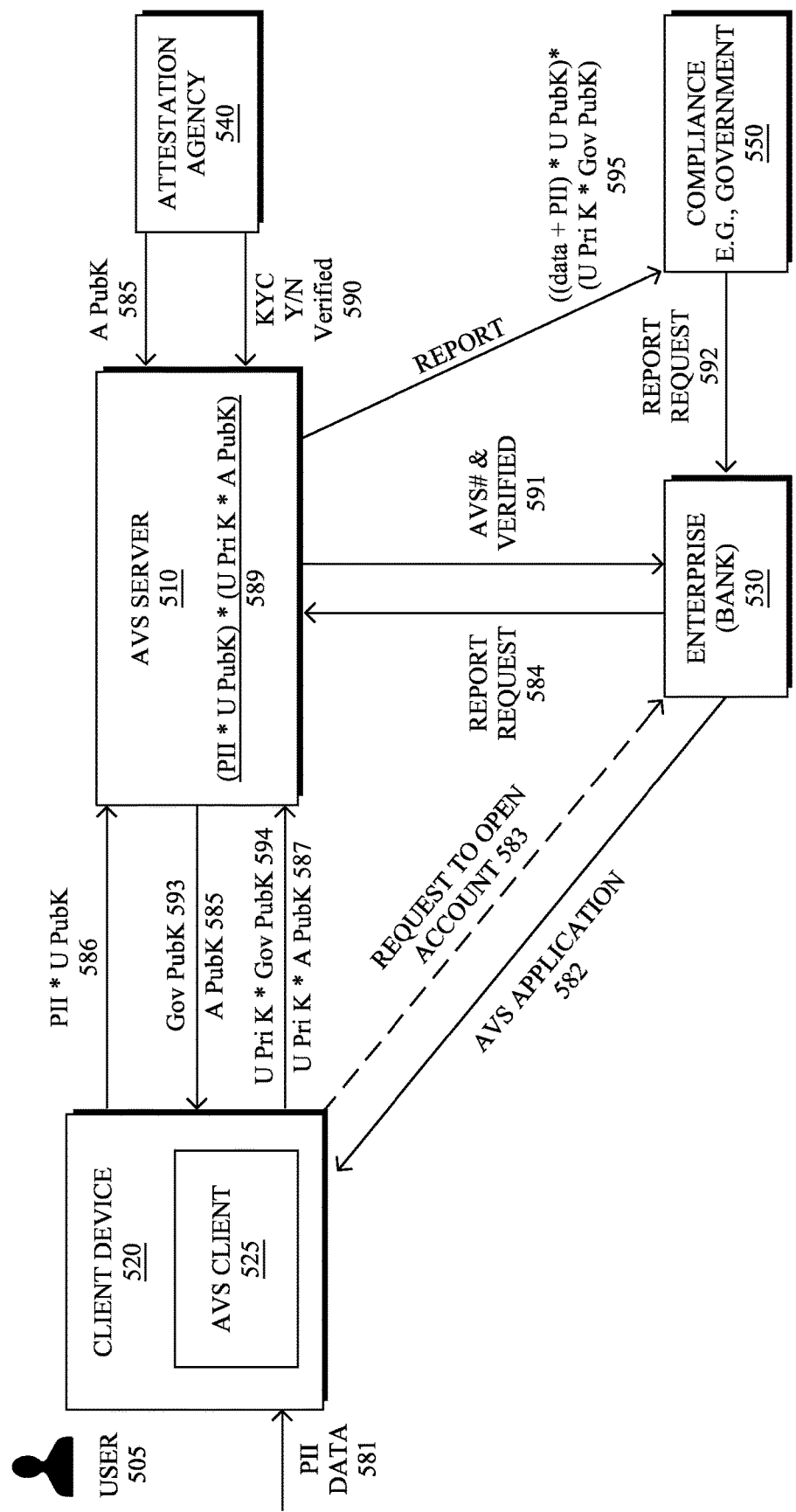
FIG. 5 illustrates an example basic architecture and example flow for user onboarding according to one or more embodiments herein.

In particular, FIG. 5 illustrates an example basic architecture 500 and example message/information flow for user onboarding to an illustrative computing environment herein. For instance, the illustrative primary components of the architecture are the "AVS server" 510 (implementing or at least coordinating/facilitating the techniques herein), a client device 520 operating an "AVS client" or application/app 525, and an enterprise 530 (e.g., bank, call center, company, etc.), which may be embodied as a local, remote, or distributed contact center or other private network entity. Additionally, an attestation agency 540 may be used to attest to (verify) the identity of the user 505. In certain embodiments, a compliance service 550 (e.g., the government) may also be connected to the AVS server and the enterprise in order to request and receive reports about the users, as will be understood by those skilled in the art. Note that for certain embodiments herein, the communications between the devices in FIG. 5 may be securely managed (transmitted and stored) in accordance with a zero-knowledge data management network as mentioned above. That is, the architecture 500 of FIG. 5 may be used in conjunction with the zero-knowledge data management technique described in FIG. 4 above, serving as a foundation for a infrastructure of both the zero-knowledge data management system and the access control and identity verification system described herein. Further, as described in greater detail below, the communications between devices, particularly the client device 520 and the enterprise 530, may be securely managed as a communication session, such as a VPN or other secure communication channel, accordingly.

According to one specific embodiment of user onboarding and authentication (e.g., initial verification of a new user, employee, student, teleworker, etc.), a third-party (e.g., the AVS server) can obtain attestation from an attestation service by: storing PII information on a third-party server, wherein the third-party server and an attestation service cannot read the stored information; storing, on the third-party server, a re-encryption key that converts the stored information to a format readable to only the attestation service; requesting, by the third-party server from the attestation service, attestation of whether the stored information is correct, wherein requesting comprises applying the re-encryption key to the stored information and sending the stored information, in the format readable to only the attestation service, to the attestation service; receiving, by the third-party server from the attestation service, an indication as to whether the stored information, which cannot be read by the third-party server, is attested as correct by the attestation service; and providing, from the third-party server, the indication as to whether the stored information is attested as correct by the attestation service to an interested device (e.g., the enterprise/bank), without the third-party server knowing the information.

Specifically, this type of "zero-knowledge attestation" according to one or more specific embodiments herein, begins with attestation agency/server being configured as a verification service that comprises one or both of automated attestation or manually assisted attestation techniques, as generally understood by those skilled in the art. For example, a typical identity verification service, in particular, ensures that users or customers provide information that is associated with the identity of a real person, such as by verifying the authenticity of physical identity documents such as a driver's license or passport ("documentary verification"), and/or by verify identity information against authoritative sources such as a credit bureau or government data ("non-documentary verification"). Manually-assisted techniques, which may be performed also through artificial intelligence, may include identity verification through webcams (e.g., holding up a driver's license next to a user's face to confirm the visual comparison and the data on the license). Identity "scoring" (e.g., likelihood that a user is who they say they are) may also be used and shared as a result, e.g., rather than (or in addition to) a simple yes/no or verified/not result. To attest to data integrity, on the other hand, various methods of trusted computing and remote attestation may be used, allowing a program at the source device to authenticate itself (e.g., the software/version running at the source device) or the data (e.g., computed hashes, configuration data, revision tracking, and other data/metadata-based information). Completeness of the records/data may also be attested to, such as confirmations that all requested data fields have been filled in with legitimate answers, even if the accuracy of the answers themselves are not specifically attested to in certain configurations. Note that many different techniques may be used for identity and data integrity attestation, and that the specific techniques shown herein are merely examples for a better understanding of the role and responsibilities of attestation server/agency.

With reference still to FIG. 5, a communication exchange between the devices of the attestation service environment is based on an attestation request from the AVS server. Generally, any device within the system in FIG. 5 can initiate the attestation request, such as the AVS/storage server, the client device, or the enterprise/bank as a verifying recipient device which may receive a signed certificate, a confirmation message, etc., without ever seeing the actual information/PII used for attestation.

As an example, a user 505, such as an employee, contact center agent, teleworker, student, etc., may enter his/her identity information as "source data" (PII data) 581 at the source device 520 (e.g., through the AVS app/client 525, which may be downloaded/obtained (582, as shown) from the enterprise 530 (e.g., branded), or from the AVS Server 510 (e.g., general)). The source device may then open or confirm an account (e.g., a bank account, corporate account, student account, etc.) through request 583. In certain embodiments, the source data may be kept in secret, and as such, the source device or the controller device (enterprise 530) may inform the storage server 510 that a new user is trying to establish/confirm an account (report 584), and that an attestation to the identity of the user is needed (i.e., the source/PII data), thus "report 584" is also an "attestation request 584". Notably, collection of the source data may be generalized (e.g., the source device collects the data to share generally with other devices as requested), or else the collection may be specifically directed by other devices, such as the attestation server, the controller device, or any other verifying recipient device. That is, the source device may receive instructions from any of these devices to collect the source data, either generally or in response specifically to an attestation request.

In this embodiment, the attestation server 540 shares its public key (A PubK) 585, either to the source device 520 directly or else to the storage server 510 which can then share it with the source device. Alternatively, the attestation server public key may be shared with the source device by any other method, including by being publicly known. Note that the source device may already have the attestation server's public key prior to the attestation request, or else may receive it in response to the attestation request (e.g., the storage server connects with the attestation server and obtains the attestation server's public encryption key, to then share it with the source device).

At this point, in this specific embodiment, the storage server 510 may either already have the source-encrypted source data (PII encrypted by the user's public key, U PubK) 586, or else the source device may encrypt the source data and provide the storage server with the source-encrypted source data 586. Here, the source device 520, in response to the attestation request (and in certain embodiments, thus receiving the attestation public key) establishes an attestation-server-based rekeying key 587 through an encrypting combination of the source decryption key (e.g., a private key, U PriK) of the source device and the attestation server public key (A PubK). Accordingly, by sending the attestation-server-based rekeying key 587 to the storage server 510, and in response to the attestation request 584 received at the storage server (i.e., a request to share the source/PII data with the attestation server), the AVS/storage server re-encrypts (e.g., is caused to re-encrypt) the source-encrypted source data 586 with the attestation-server-based rekeying key 587, where the re-encrypting results in the source/PII data being encrypted with the attestation server public key (attestation-server-based encrypted source data 589). Note still that the AVS/storage server is unable to decrypt the source data encrypted with the attestation server public key (i.e., attestation-server-based encrypted source data 589).

The AVS/storage server 510 may then send the attestation-server-based encrypted source data 589 to the attestation server 540 in response to the attestation request. Notably, the specific attestation request for source data may be associated with a trackable identifier (ID) in order to coordinate the attestation to the source data (e.g., a hash function of the data). That is, the ID pairs the request (and also a signed certificate, described below) with the source data (and thus source-encrypted source data).

Once the attestation server 540 receives the source data encrypted with the attestation server public key (attestation-server-based encrypted source data 589) from the storage server 510, then the attestation server applies its own private key to obtain and process the user's identity information from the previously encrypted source data (i.e., decrypting the attestation-server-based encrypted source data using an attestation server private key of the attestation server).

The attestation server may now view, verify, and attest to the decrypted source data (e.g., to the personally identifying information (PII), or else to the data integrity in other examples mentioned herein), using various attestation techniques. For example, PhI may be attested to based solely on the source data (e.g., documentary verification) or else on greater information (e.g., non-documentary verification). For example, a communication may be established between the source device and the attestation server, where the attestation server is configured to attest to the PhI based on the source data and user interaction via the established communication (e.g., webcam verification, real-time question answering, etc.). Any suitable attestation technique may be used herein, and those mentioned above are merely example embodiments for illustration.

Assuming the data is verified by the attestation server 540 (e.g., manually, autonomously, and/or autonomously with manual assistance), then the attestation server creates a signed certificate ("know your customer" or "KYC" Y/N Verified) 590 signifying (acknowledging) the attestation to the source data (or non-attestation). The attestation contents of the certificate may be anything from a simple "verified" indication, an attestation score, a report of what is being attested to (e.g., "this certifies that user ID #12345 has acceptably provided their identity on this date"), and so on. In particular, according to the techniques herein, the attestation server creates a signed certificate (based on attesting to the source data) that would allow a verifying recipient device to confirm that the source data has been attested to by the attestation server based only on the signed certificate (i.e., without accessing/decrypting the source-encrypted source data). In one embodiment, the verification may be associated with a particular identification number tying it to the original request (e.g., an "AVS # & Verified" message 591), either by the attestation server 590 or appended by the AVS server 510.

In one embodiment, similar to digital signature techniques, the attestation server 540 signs its verification message (signing the signed certificate) 590 by encrypting the verification message (attestation contents) by its own private key (attestation server private key). This message can then be decrypted by any verifying recipient device (e.g., the enterprise 530) with knowledge of public key of the attestation server (which is known to everyone as it is public). Said differently, the verifying recipient device is caused to confirm that the source data has been attested to by the attestation server based on applying the attestation server public key to the signed certificate. Since the public key of the attestation server decrypts the message, it is proof that only the attestation server (the only entity that knows the attestation server's private key) could have written and signed this verification message.

Notably, as shown in FIG. 5, similar zero-knowledge storage and reporting of the PII information may also be performed by the AVS server for sharing reports with the compliance device 550, e.g., sharing KYC PII information with the government for flagged transactions. For instance, the compliance device 550 may send a report request 592 to an enterprise 530 (e.g., a compliance report) in response to any number of triggers. Since the client device 520 also has obtained the compliance device's public key (Gov PubK) 593, it can then also create a compliance-device-based rekeying key 594 through an encrypting combination of the source decryption key (e.g., private key, U PriK) of the source device and the compliance device public key (Gov PubK). Accordingly, by sending the compliance-device-based rekeying key 594 to the storage server 510, and in response to the report request 592, the storage server re-encrypts (e.g., is caused to re-encrypt) the source-encrypted source data 586 (and optionally other report-related data) with the compliance-device-based rekeying key 594, where the re-encrypting results in the source/PII data being encrypted with the compliance device public key (compliance-device-based encrypted source data 595). Note still that the storage server is unable to decrypt the source data encrypted with the compliance device public key (i.e., compliance-device-based encrypted source data 595). The storage server 510 may then send the compliance-device-based encrypted source data 595 to the compliance device 550, which can then apply its own private key to obtain and process the user's identity information (and optionally other report data) from the previously encrypted source data (i.e., decrypting the compliance-device-based encrypted source data using a compliance device private key of the compliance device).

——Personalized VPN Session Management——

As noted above, users have already been teleworking, though the recent pandemic has increased not only the number of teleworkers, but the type as well. For instance, corporate workers have moved in droves to teleworking environments, but positions that have typically been in-office-only positions, such as call center agents, particularly for banks, have also moved into people's homes.

The need to access confidential information residing on servers introduces a security challenge that has been addressed in a number of ways in the past. However, many of such techniques may be easily worked around (stolen passwords or token devices, etc.), or don't address the need for continued security after an initial login. For instance, abuse of teleworking has led to authenticated users logging in to a corporate network, only to hand responsibilities of the job over to an unverified secondary user. Also, teleworking allows for other non-verified individuals to have the opportunity to eavesdrop on displayed information, such as other family members within a household or else other patrons at a coffee shop.

The techniques herein, therefore, provide personalized VPN management (or other secured sessions) where confidential information is securely presented only to people who have the right to access it.

Figure 6:
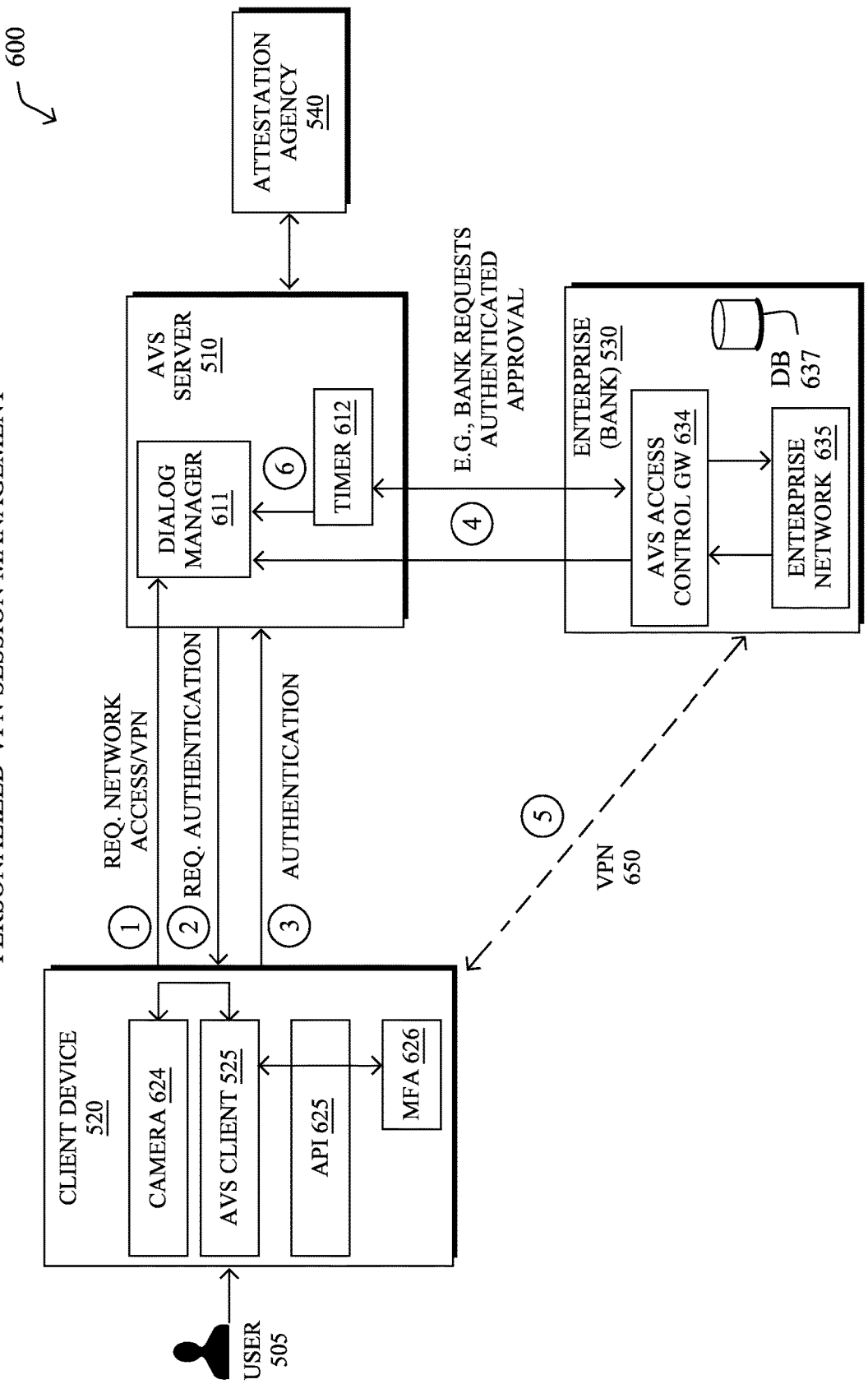
FIG. 6 illustrates one example of providing personalized secure communication management according to one or more embodiments herein.

FIG. 6, in particular, shows an environment 600 in which a remote user 505 is attempting to log into a corporate network (e.g., an enterprise 530, such as a bank) by establishing a VPN tunnel 650 (or other secure connection) between his client device 520 (e.g., a desktop computer, laptop, tablet, mobile device, etc.) and the enterprise network 635 (such as for access to databases, various apps/programs, and so on). In accordance with traditional practice, during the request for network access (e.g., the VPN) ("1"), the user may first be asked to enter a password to ensure that he is the person attempting to log into the corporate network. Upon providing the right password, the user proves that he knows a secret that the valid user knows.

To increase security using traditional MFA techniques, the system may send a specific code to the user's second device such as his e.g., mobile phone, email, etc., and ask the user to enter this code into the first system. Assuming that it is a valid user who is attempting to sign into the network, the user would then enter into the first device the code which was sent to his second device (which, notably in certain situations, may be the same device as the first device). Upon entering the right code the user proves that he is in a possession of the second device. However, if a malicious user gets access to the valid user's password and gains access to his second device, the malicious user may gain access to the corporate network and jeopardize the security of the enterprise.

Additionally, the authorized user may intentionally or unintentionally expose the screen of his device, e.g., his computer, as to allow an unauthorized user to see the confidential information on the screen or otherwise, to gain access to the enterprise network 635.

To overcome this threat vector, a system in accordance with the present disclosure uses the AVS client application 525. In particular, upon detecting the request by the user to access corporate resources (e.g., establish VPN tunnel to the corporate network), the AVS client (in response to the login or in response to a request for authentication "2", such as from a dialog manager 611) invokes a specific multi-factor authentication (MFA) (e.g., MFA module 626 via API 625), such as facial recognition through camera 634, or other biometric interfaces such as fingerprint(s), palm, eye/retina, etc., to ensure that the user who is trying to gain access to the corporate network or attempting to run a specific application is actually the claimed user and not someone who gained access to the user's password and/or to a second device of the valid user.

In accordance with one specific implementation, the MFA may be performed locally by the client device 520 used by the user. In accordance with another specific implementation, the MFA may be performed in collaboration between the client device 520 and the AVS server 510 (e.g., a dialog manager 611 and associated timer(s) 612) and a database (DB) 637 that is associated with the enterprise network 635 and can be located at the enterprise 530 (as shown), in the AVS server 510 or associated cloud/network, in the attestation server/agency 540, or at any other location associated with the network 600.

Upon proper authentication ("3"), the AVS server 510 (e.g., dialog manager 611) notifies the AVS access control gateway (ACG) 634 (or other coordinated gateway for the enterprise network 635) that the user 505 is a valid authorized user and should be granted access to the enterprise resources ("4"). That is, in accordance with a specific embodiment, the AVS ACG 634 facilitates establishment of a VPN tunnel 650 between the user's device 520 and the enterprise network 635 ("5").

In accordance with another aspect of the invention, as the AVS server establishes that the user who attempts to access the network is a valid and authorized user, the AVS server starts a timer 612 which generates periodic triggers ("6"), e.g., once every five seconds. Each time when the timer generates a trigger, the AVS server requests the AVS client application to provide yet another authentication, e.g., take a picture of the user, scan the retina of the user, etc., and ensure that the user is still using the client device or otherwise, as described herein.

In accordance with one specific implementation, if the camera does not detect the face of the valid user in front of the screen, the tunnel shuts down and the user is disconnected from the corporate network.

In accordance with another specific implementation, the camera is always on and the timing of taking the picture of the user is random time rather than a deterministic time period (e.g., random rather than five seconds).

In accordance with still another specific implementation, in addition to or as an alternative to the timer, one or more other triggers may be used to confirm/reauthenticate the user, such as increased security sessions or specific data access, certain transactions, manual triggering by an admin (e.g., for overseeing activity, security risk mitigation (e.g., termination of an employee), etc.), triggering in response to anomalous user behavior (e.g., based on deviations from expected and/or permitted behavior, such as according to various policies, machine learning observations, etc.), and so on.

In accordance with another embodiment, if the system detects more than one user, e.g., the son of the valid user entered the room and is captured by the camera, the secure session may be terminated (e.g., the VPN is dissolved) and access to the corporate network is denied.

In accordance with another specific implementation, if more than one user is detected, the system determines the facial features of the other users (users other than the originally authenticated user), and sends them over an encrypted channel to the AVS server. (Other detections of multiple people within the area of the client device 520 aside from facial recognition may also include such things as skeletal recognized bodies, audio of voices, and so on.) If the server determines that the other people are authorized to access the resources, the timer is reset and the access of the user (or users in this case) to the enterprise resources continues uninterrupted. However, if the AVS server is not able to validate that the other users are authorized to access the enterprise resources, the system may alert the user about the identified issue and disconnect his access to the network. Additionally, the system may send an alert (e.g., to a security team) about the security protocol violation, optionally including the (encrypted) picture of the detected unauthorized users.

In accordance with another aspect of the techniques herein, the original user may declare at the beginning of the session that he expects one or more other user(s) to join him at a later time. If the users are present, the system may validate and authenticate the additional users including verify that these users have the credentials that would allow them to take advantage of the corporate resources, e.g., over the established VPN. In one embodiment, the original user may be authorized to merely approve the presence of the additional users (e.g., a manager, business owner, etc.).

In accordance with yet another embodiment, the system in association with the AVS server keeps track of the specific resources the user attempts to access and specifically the level of security of these resources, e.g., documents, apps, etc. In parallel the system maintains the level of security that the user (or any other validated and authenticated users if any) is authorized to access. In case the user attempts to access a resource which requires security level higher than any one of the identified users (by the camera of the user's device), the system may generate a security alert as discussed above (including the (optionally encrypted) pictures of the unauthorized users), and prevents the unauthorized access, e.g., by disconnecting the VPN channel.

In accordance with one embodiment, the system may be integrated into the network of the enterprise 530 as shown. Alternatively, in accordance with another embodiment, the system may be integrated into a VPN service provider who controls the access to the enterprise and ensures that only users that are allowed to create a VPN into the enterprise are actually provided with this access. Additionally, as explained above, the VPN service provider may disconnect the VPN as soon as any security violation (e.g., a detection of a second face by the camera, a detection of unauthorized person, etc.).

Figure 7:
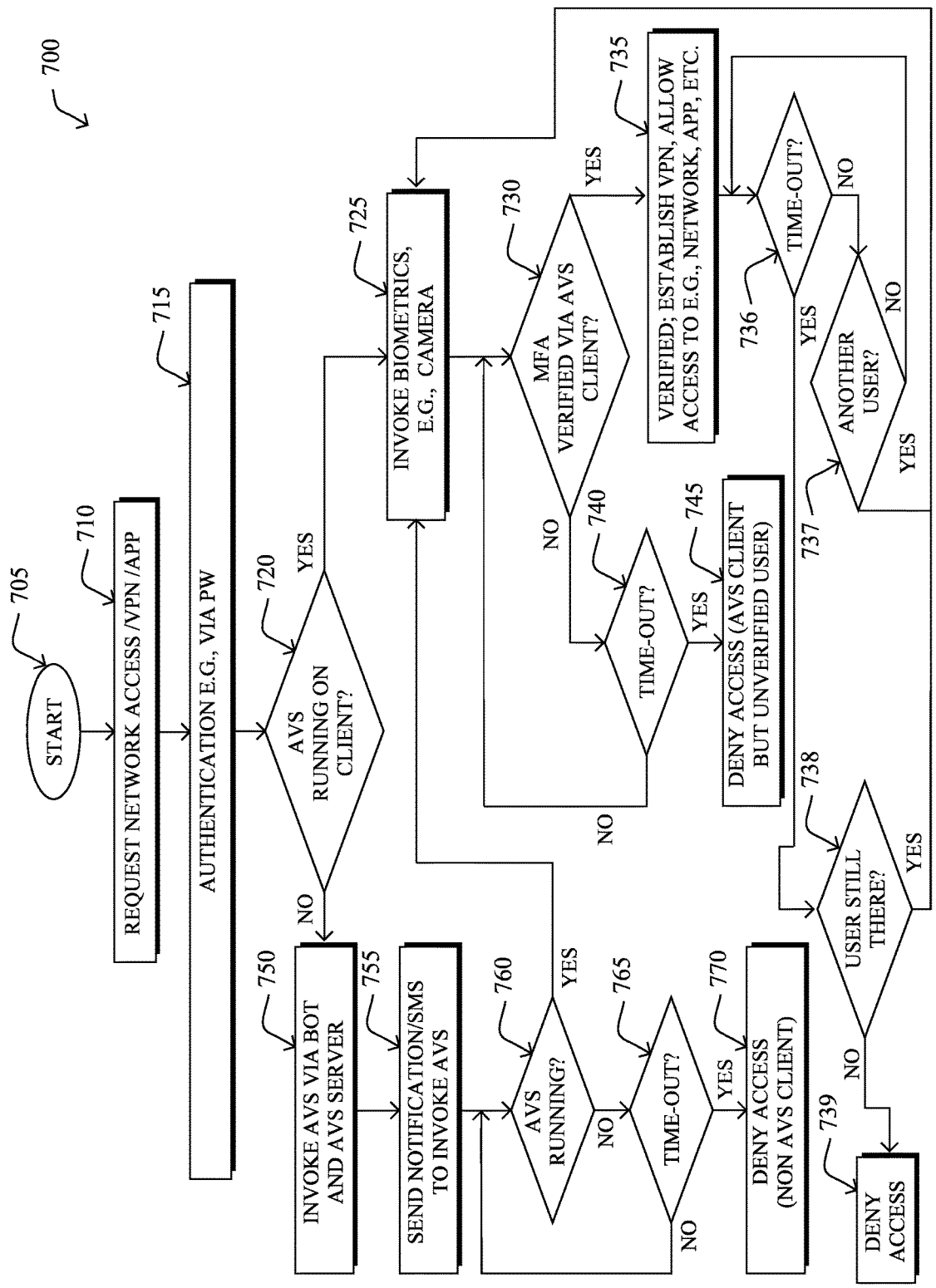
FIG. 7 illustrates an example flowchart detailing the procedure described above in FIG. 6 according to one or more embodiments herein.

FIG. 7 illustrates a flowchart detailing an example procedure 700 according to the described above in FIG. 6. Specifically, once starting in step 705, the user initiates a request for network access (e.g., a VPN session or an application/App session) in step 710, and then the AVS server attempts to authenticate the user through traditional mechanisms, such as passwords ("PW"), etc., in step 715. If the AVS app is running on the client device in step 720, then MFA queries are made on the app in step 725, such as by invoking biometrics (e.g., camera-based facial recognition), and the user(s) may be verified using the MFA module of the AVS client in step 730. For sake of simplicity, though not mentioned specifically in the flowchart, step 730 analyzes the image that the camera of the device captures and determines how many users are present in front of the screen (and the following steps may be executed for each one of the identified users). If the MFA determines that the user(s) of in front of the screen are all verified, then in step 735 the method establishes a VPN connection for the verified user(s), which allows access to the resources (e.g., a network, the App, etc.) in step 735. According to the techniques herein, a timer may be invoked in step 736 for reauthentication (or, notably, other triggers for reauthentication). If at any time during this timer a new user/person appears on camera (or is otherwise detected) in step 737, then biometrics may be run on the new user in step 725 to confirm whether the new user is also authenticated. On the other hand, upon time-out in step 736, assuming the original user is still there in step 738, the procedure returns to step 725 for additional MFA queries (e.g., a new facial recognition scan) to confirm that the original user is verified. (If it is detected in step 738 that the user is no longer there, whether based on simple video recognition, idle states (e.g., sleep) of the client device, or otherwise), then the access to the resources may be immediately denied/terminated in step 739, accordingly.)

If the user (or otherwise any of the users in front of the device) is not verified by the MFA module of AVS client (or by collaboration between the client and server components of the MFA) in step 730, either initially or else in response to any follow-on query during an established secure session (e.g., VPN), by an expired timeout in step 740, then the user (with the AVS client application) is marked as unverified in step 745, and is denied access to the resources (e.g., the VPN is shut down). For instance, this may be because one or more users located at the client device are unverified users (e.g., the primary user or any background users/bystanders), or because an initially verified user is no longer present (whether replaced by a new/unverified user or simply having walked away from the client device and leaving it unattended).

Conversely, if the AVS app is not running on the client device in step 720 (but notably where the user has authenticated with an initial password), then it may be invoked (activated) via a bot and the AVS server in step 750, and notifications (alerts) or SMS/text messages may be sent to have the user invoke the AVS app on the client device in step 755. In accordance with another embodiment (not shown) the AVS client application always runs in the background. If the AVS app is determined to be running in step 760 before a timeout in step 765, then MFA queries (e.g., biometrics) may be made in step 725 as mentioned above. However, if the AVS app fails to establish communication with the AVS server (e.g., it does not get started) in step 760 before the expiration of the timer in step 765, then the user at the client device is marked as unauthenticated by the AVS client in step 770 and access to the protected resources (e.g., establishment of a VPN) is denied (even though the user may have first authenticated with a password in step 715 above). It should be noted that access can be denied either before it has been established, or alternatively, once access is established, denial of access results in withdrawing the credentials and disconnecting (or turning down) the VPN connection.

Note that while the techniques above have thus far described an "all or nothing" approach to secure session management (e.g., the VPN is established and continues, or else is not established or is terminated), secure session management herein may be more granular in certain embodiments herein. For instance, rather than shutting down a secure session, management of a secure session may involve granular access to particular information, such as particular files, particular portions of a display, particular fields of an application, etc. In such embodiments, the secure session itself may remain intact, while portions of data/displays may be controlled individually based on whether a user 505 is present (e.g., and looking at the screen), whether other people are present (e.g., and optionally looking at the screen), and so on. This may be particularly beneficial in situations where a user bends down to tie their shoe, or where the user's child may walk behind the user's desk to ask a question or grab a pen off the user's desk, without having to completely end a session and reestablish a new session.

For example, FIGS. 8A-8B illustrate this concept with an "auto-redaction" control within a simplified enterprise application dashboard 810. In particular, assume that the dashboard is for a call center agent (e.g., for a bank), and has a number of fields that may be populated based on a given caller session, such as, e.g., a caller session ID 822, a caller name 824, a caller account number 826, a caller account balance 828, and session notes 830, in addition to a number of actions 835, such as "hold", "close", "forward", and so on. As can be seen in FIG. 8A, the dashboard 810 displays all of the information in the fields, thus implying that the authorized user is present, looking at the screen, and that no one else is behind the authorized user. However, as can be seen in FIG. 8B, in response to any unauthorized situation described above (e.g., the authorized user no longer being present or no longer looking at the screen, another unauthorized person being present, and so on) the dashboard 810 now shows redacted fields/actions to protect the enterprise's proprietary/secret information. When the authorized user returns, or when any unauthorized users are no longer present, the dashboard may then return to the un-redacted version in FIG. 8A, accordingly. Note that any configuration of secure limitation of visible data or performable actions may be configured (e.g., the entire dashboard being hidden, only the actions being greyed out, and so on), and the examples shown herein are merely illustrative.

Advantageously, the techniques described herein thus provide for personalized secure communication session management. In particular, the techniques herein provide a frictionless experience that ensures that only the authorized person has access to an enterprise network (e.g., its VPN), and that no other person is eavesdropping on or otherwise piggybacking into the session. The techniques herein further ensure that the VPN session (or other secure session) encompasses all applications running while the authorized person is associated with enterprise network.

Illustratively, the techniques described herein may be performed by hardware, software, and/or firmware, such as in accordance with the "access and verification" process 248 in correlation with the secure session manager 249, which may each include computer executable instructions executed by a processor 220 (of a particular correspondingly operative computing device 200) to perform functions relating to the techniques described herein, e.g., in conjunction with other devices which may have a correspondingly configured processes depending upon the functionality of the device, as described below (e.g., a user device, a storage server, a call center device, a controller device, an attestation service, and so on).

Figure 9:
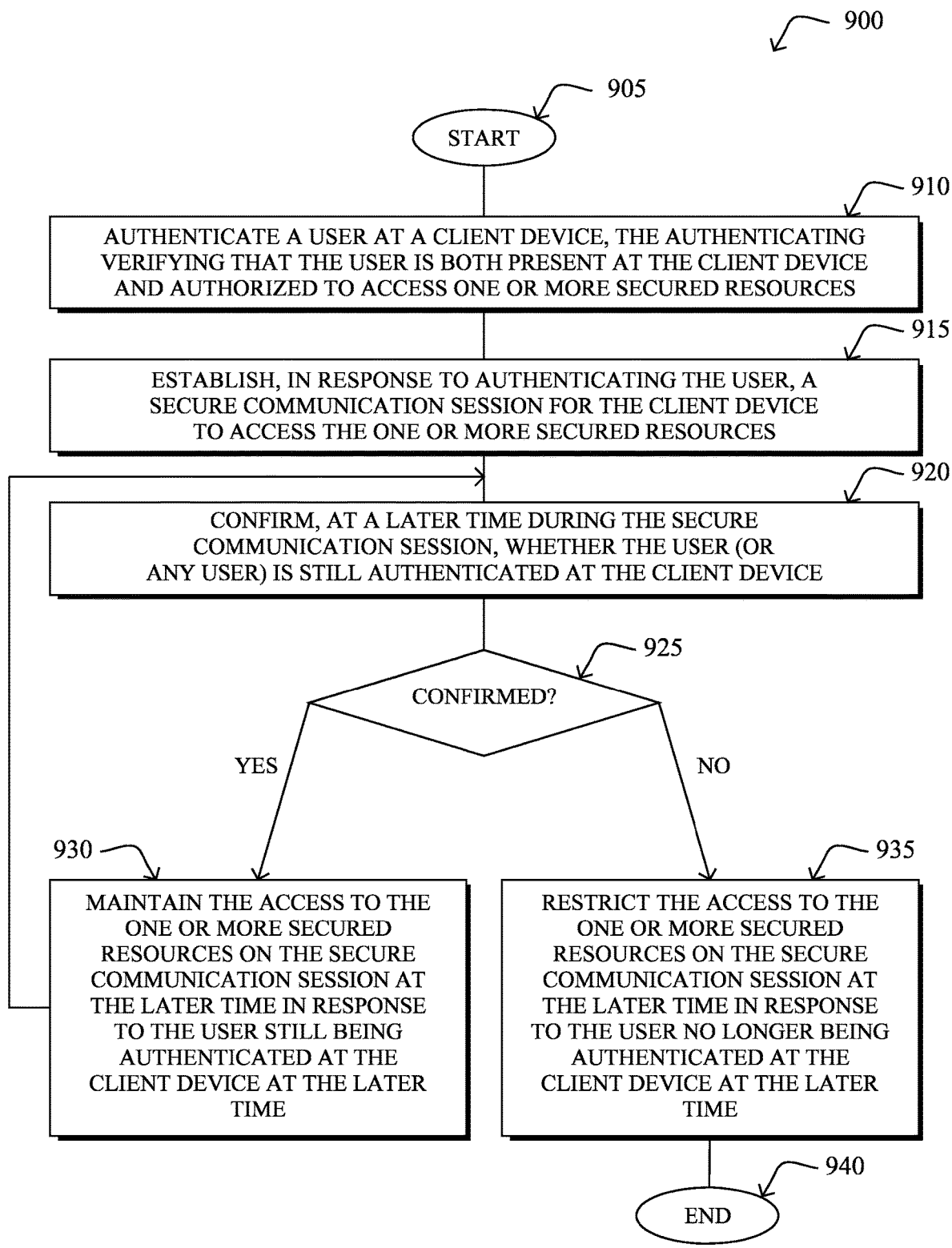
FIG. 9 illustrates an example simplified procedure for providing personalized secure communication management in accordance with one or more embodiments described herein.

FIG. 9 illustrates an example simplified procedure for providing access control and identity verification for communications between an initiating device and a recipient device in accordance with one or more embodiments described herein. For example, a non-generic, specifically configured device (e.g., device 200, such as a client device 520, an AVS server 510, etc.) may perform procedure 900 by executing stored instructions (e.g., processes 248/249). The procedure 900 may start at step 905, and continues to step 910, where, as described in greater detail above, a user is authenticated at a client device 520, where the authenticating verifies that the user is both present at the client device (e.g., biometrics) and authorized to access one or more secured resources (e.g., login procedures). In response to authenticating the user, in step 915 a secure communication session (e.g., a VPN) may then be established for the client device to access the one or more secured resources.

In step 920, at a later time during the secure communication session, the techniques herein may then determine whether the user is still authenticated at the client device. As noted above, the later time may be periodic, random, or in response to any number of selected security triggers.

If the confirmation is successful in step 925 (i.e., the user is still present and the user is still authorized to access the resources), then in step 930 access to the one or more secured resources is maintained on the secure communication session at the later time, and the procedure may return to step 920 for future later times. On the other hand, in response to the user (or any user) no longer being authenticated at the client device at the later time (that is, in response to a change in user, a change in the original user's authentication status, and/or detecting the presence of another user who has not been authenticated) in step 925, then in step 935 the techniques herein may restrict the access to the one or more secured resources on the secure communication session at the later time (e.g., terminate the session (e.g., the VPN session), limit access to resources, etc.). The procedure 900 may then end in step 940 or alternatively return to step 910 above.

It should be noted that the steps shown and described in the procedures above are merely examples for illustration, and certain other steps may be included or excluded as desired. For instance, other steps may also be included generally within procedures above as described herein. For example, such steps (whether additional steps or furtherance of steps already specifically illustrated above) may include such things as: detecting and authenticating additional people (e.g., in the background or as a replacement to the authenticated user), and so on. Further, while a particular order of the steps is shown, this ordering is merely illustrative, and any suitable arrangement of the steps may be utilized without departing from the scope of the embodiments herein. Moreover, while procedures may be described separately, certain steps from each procedure may be incorporated into each other procedure, and the procedures are not meant to be mutually exclusive.

In closing, an illustrative method according to one or more embodiments of the present disclosure may comprise: authenticating, by a process, a user at a client device, the authenticating verifying that the user is both present at the client device and authorized to access one or more secured resources; establishing, by the process in response to authenticating the user, a secure communication session for the client device to access the one or more secured resources; confirming, by the process, at a later time during the secure communication session, whether the user is still authenticated at the client device; maintaining, by the process, the access to the one or more secured resources on the secure communication session at the later time in response to the user still being authenticated at the client device at the later time; and restricting, by the process, the access to the one or more secured resources on the secure communication session at the later time in response to the user no longer being authenticated at the client device at the later time.

In one embodiment, the secure communication session comprises a virtual private network (VPN) session.

In one embodiment, the method further comprises: triggering the later time based on one or more of a periodic timer, a random timer, and a continuous operation.

In one embodiment, the method further comprises: triggering the later time based on one or more security trigger events. In one embodiment, the one or more security trigger events are selected from a group consisting of: a transaction; a specific type of transaction; a particular action; an increase in security access; accessing particular resources; administrator manual triggering; anomalous behavior of the user; and returning from an idle client device state.

In one embodiment, the method further comprises: detecting an additional person at the client device during the secure communication session; determining whether the additional person is authorized to access the one or more secured resources; maintaining the access to the one or more secured resources on the secure communication session in response to the additional person being authorized to access the one or more secured resources; and restricting the access to the one or more secured resources on the secure communication session in response to the additional person not being authorized to access the one or more secured resources. In one embodiment, additional persons are never authorized to access the one or more secured resources, and wherein restricting the access to the one or more secured resources on the secure communication session occurs in response to the detecting of the additional person. In one embodiment, the method further comprises: receiving an indication to expect the additional person during the secure communications session. In one embodiment, detecting the additional person is based on one or more of: facial recognition; body detection; motion detection; video analysis; and audio detection. In one embodiment, the method further comprises, in response to the additional person not being authorized to access the one or more secured resources: sharing information on the addition person for security analysis.

In one embodiment, verifying that the user is present at the client device is based on biometric attestation selected from a group consisting of: facial recognition; recognition of one or more fingerprints; and eye scans (such as iris recognition, retina recognition, or other eye scans).

In one embodiment, authenticating the user at a client device comprises first verifying that the user is authorized to access the one or more secured resources based on a user login, and then verifying that the user is present at the client device based on biometric attestation of the user at the client device.

In one embodiment, confirming comprises: instructing the client device to re-authenticate the user.

In one embodiment, the authenticating is local to the client device.

In one embodiment, the authenticating comprises a collaboration between the client device and one or more network devices associated with the one or more secured resources.

In one embodiment, the authenticating comprises a collaboration between the client device and one or more third-party facilitator devices, and wherein the establishing of the secure communication session is based on approval by the one or more third-party facilitator devices.

In one embodiment, network devices associated with the one or more secured resources are aware that the user is both present at the client device and authorized to access one or more secured resources, and are unaware of an identity of the user.

In one embodiment, restricting the access to the one or more secured resources comprises: terminating the secure communication session.

In one embodiment, restricting the access to the one or more secured resources comprises: limiting access to specific items within the secure communication session.

Also, an illustrative apparatus according to one or more embodiments of the present disclosure may comprise: one or more network interfaces to communicate with a computer network; a processor coupled to the network interfaces and adapted to execute one or more processes; and a memory configured to store a process executable by the processor, the process when executed operable to perform a method comprising: authenticating a user at a client device, the authenticating verifying that the user is both present at the client device and authorized to access one or more secured resources; establishing, in response to authenticating the user, a secure communication session for the client device to access the one or more secured resources; confirming, at a later time during the secure communication session, whether the user is still authenticated at the client device; maintaining the access to the one or more secured resources on the secure communication session at the later time in response to the user still being authenticated at the client device at the later time; and restricting the access to the one or more secured resources on the secure communication session at the later time in response to the user no longer being authenticated at the client device at the later time.

Furthermore, an illustrative tangible, non-transitory, computer-readable medium according to one or more embodiments of the present disclosure may store program instructions that cause a computer to execute a process comprising: authenticating a user at a client device, the authenticating verifying that the user is both present at the client device and authorized to access one or more secured resources; establishing, in response to authenticating the user, a secure communication session for the client device to access the one or more secured resources; confirming, at a later time during the secure communication session, whether the user is still authenticated at the client device; maintaining the access to the one or more secured resources on the secure communication session at the later time in response to the user still being authenticated at the client device at the later time; and restricting the access to the one or more secured resources on the secure communication session at the later time in response to the user no longer being authenticated at the client device at the later time.

While there have been shown and described illustrative embodiments, it is to be understood that various other adaptations and modifications may be made within the scope of the embodiments herein. For example, though the disclosure was often described with respect to enterprise, or more specifically, call center, examples, those skilled in the art should understand that this was done only for illustrative purpose and without limitations, and the techniques herein may be used for any secure communication environment between any two end-users/systems. Furthermore, while the embodiments may have been demonstrated with respect to certain communication environments, physical environments, or device form factors, other configurations may be conceived by those skilled in the art that would remain within the contemplated subject matter of the description above. For example, while virtual private networks (VPNs) in particular have been shown and described, other secure end-to-end communication sessions may utilize the techniques herein, and VPNs are merely one common example of such sessions.

In addition, while the techniques have been described above in terms of one-to-one communication (user-to-enterprise), the present disclosure may be applicable to one-to-many or many-to-one communications, such as conference calls, web conferences, and so on. For example, attendees of a one-to-many or many-to-many conference may need to verify the identity of certain or all of the users, for security, attendance, or other reasons. Example scenarios may include education, seminars, board meetings, shareholder meetings, business meetings, and so on.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    authenticating, by a process, a user at a client device, the authenticating verifying that the user is both present at the client device and authorized to access one or more secured resources;
    establishing, by the process in response to authenticating the user, a secure communication session for the client device to access the one or more secured resources;
    confirming, by the process, at a later time during the secure communication session, whether the user is still authenticated at the client device;
    maintaining, by the process, the access to the one or more secured resources on the secure communication session at the later time in response to the user still being authenticated at the client device at the later time; and
    restricting, by the process, the access to the one or more secured resources on the secure communication session at the later time in response to the user not being authenticated at the client device at the later time due to the user no longer being present at the client device at which the user was authenticated, wherein:
    i) additional persons are never authorized to access the one or more secured resources, and wherein restricting the access to the one or more secured resources on the secure communication session occurs in response to the detecting of an additional person, or
    ii) the process receives an indication to expect the additional person during the secure communications session and, in response to the indication, maintains the access to the one or more secured resources.

2. The method as in claim 1, wherein the secure communication session comprises a virtual private network (VPN) session.

3. The method as in claim 1, further comprising:
    triggering the later time based on one or more of a periodic timer, a random timer, and a continuous operation.

4. The method as in claim 1, further comprising:
    triggering the later time based on one or more security trigger events.

5. The method as in claim 4, wherein the one or more security trigger events are selected from a group consisting of: a transaction; a specific type of transaction; a particular action; an increase in security access; accessing particular resources; administrator manual triggering; anomalous behavior of the user; and returning from an idle client device state.

6. The method as in claim 1, further comprising:
    performing a periodic verification that the user is still using the client device at which the user was authenticated.

7. The method as in claim 1, wherein detecting the additional person is based on one or more of: facial recognition; body detection; motion detection; video analysis; and audio detection.

8. The method as in claim 1, further comprising, in response to the additional person not being authorized to access the one or more secured resources:
    sharing information on the additional person for security analysis.

9. The method as in claim 1, wherein verifying that the user is present at the client device is based on biometric attestation selected from a group consisting of: facial recognition; recognition of one or more fingerprints; and eye scans.

10. The method as in claim 1, wherein authenticating the user at a client device comprises first verifying that the user is authorized to access the one or more secured resources based on a user login, and then verifying that the user is present at the client device based on biometric attestation of the user at the client device.

11. The method as in claim 1, wherein confirming comprises:
    instructing the client device to re-authenticate the user.

12. The method as in claim 1, wherein the authenticating is local to the client device.

13. The method as in claim 1, wherein the authenticating comprises a collaboration between the client device and one or more network devices associated with the one or more secured resources.

14. The method as in claim 1, wherein the authenticating comprises a collaboration between the client device and one or more third-party facilitator devices, and wherein the establishing of the secure communication session is based on approval by the one or more third-party facilitator devices.

15. The method as in claim 14, wherein network devices associated with the one or more secured resources are aware that the user is both present at the client device and authorized to access one or more secured resources, and are unaware of an identity of the user.

16. The method as in claim 1, wherein restricting the access to the one or more secured resources comprises:
    terminating the secure communication session or limiting access to specific items within the secure communication session.

17. A tangible, non-transitory, computer-readable medium storing program instructions that cause a computer to execute a process comprising:
    authenticating a user at a client device, the authenticating verifying that the user is both present at the client device and authorized to access one or more secured resources;

establishing, in response to authenticating the user, a secure communication session for the client device to access the one or more secured resources;

confirming, at a later time during the secure communication session, whether the user is still authenticated at the client device;

maintaining the access to the one or more secured resources on the secure communication session at the later time in response to the user still being authenticated at the client device at the later time; and restricting the access to the one or more secured resources on the secure communication session at the later time in response to the user not being authenticated at the client device at the later time due to the user no longer being present at the client device at which the user was authenticated, wherein:

i) additional persons are never authorized to access the one or more secured resources, and wherein restricting the access to the one or more secured resources on the secure communication session occurs in response to the detecting of an additional person, or ii) the process receives an indication to expect the additional person during the secure communications session and, in response to the indication, maintains the access to the one or more secured resources.

18. An apparatus, comprising:

one or more network interfaces to communicate with a computer network;

a processor coupled to the network interfaces and adapted to execute one or more processes; and a memory configured to store a process executable by the processor, the process when executed operable to perform a method comprising:

authenticating a user at a client device, the authenticating verifying that the user is both present at the client device and authorized to access one or more secured resources;

establishing, in response to authenticating the user, a secure communication session for the client device to access the one or more secured resources;

confirming, at a later time during the secure communication session, whether the user is still authenticated at the client device;

maintaining the access to the one or more secured resources on the secure communication session at the later time in response to the user still being authenticated at the client device at the later time; and restricting the access to the one or more secured resources on the secure communication session at the later time in response to the user not being authenticated at the client device at the later time due to the user no longer being present at the client device at which the user was authenticated, wherein:

i) additional persons are never authorized to access the one or more secured resources, and wherein restricting the access to the one or more secured resources on the secure communication session occurs in response to the detecting of an additional person, or ii) the process receives an indication to expect the additional person during the secure communications session and, in response to the indication, maintains the access to the one or more secured resources.

* * * * *